United States Patent [19]

Das et al.

[11] Patent Number: 5,761,286
[45] Date of Patent: Jun. 2, 1998

[54] METHOD FOR ENABLING COMMUNICATIONS BETWEEN CALLING AN CALLED MULTMEDIA TERMINALS

[75] Inventors: Shovon Das, Hillsdale; James R. Feeney, Holmdel, both of N.J.

[73] Assignee: AT&T Corp, Middletown, N.J.

[21] Appl. No.: 618,215

[22] Filed: Mar. 19, 1996

[51] Int. Cl.[6] .................................................. H04M 15/00
[52] U.S. Cl. ..................... 379/127; 379/93.13; 379/358; 379/272; 379/280; 370/360; 375/222; 364/514 A; 364/514 R
[58] Field of Search .................. 379/93.01, 93.13–15, 379/358, 268, 272, 280; 370/357, 360, 522; 375/222; 364/514 A, 514 R

[56] References Cited

U.S. PATENT DOCUMENTS 5,577,105  11/1996  Baum et al. ........................ 379/93.05
5,640,446  6/1997  Everett et al. ........................ 379/115

OTHER PUBLICATIONS

Harry Newton, Newton's Telecom Dictionary, p. 560, 1994.

Primary Examiner—Curtis Kuntz
Assistant Examiner—Duc Nguyen
Attorney, Agent, or Firm—Robert B. Levy

[57] ABSTRACT

Communications across a network (16) between a calling multimedia terminal (10) and at least one called multimedia terminal (12) is readily facilitated by assigning each terminal an endpoint identifier that establishes its communications path requirements. Upon entry by a calling terminal of its end-point identifier and the end-point identifier of each called terminal, a service hub (20) associated with the network automatically configures the network to provide a communications path having the appropriate attributes to connect the terminals together.

21 Claims, 1 Drawing Sheet

METHOD FOR ENABLING COMMUNICATIONS BETWEEN CALLING AN CALLED MULTMEDIA TERMINALS

TECHNICAL FIELD

This invention relates to a technique for enabling a calling multimedia terminal to readily communicate across one or more communication networks with one or more called multimedia terminals.

BACKGROUND ART

There now exist personal computers that have the ability to share speech, data, and video with other such computers. These computers are commonly referred to as multimedia terminals. Telecommunication service providers, like AT&T, presently offer one or more services to interconnect multimedia terminals to allow such multimedia terminals to communicate with each other. One such service currently offered by AT&T is The WorldWorx Personal Conference Service whereby two or more multimedia terminal users may conduct a multimedia conference call during which images, speech and data may be shared.

Present day multimedia service has proven somewhat difficult to use. To establish a connection with a called multimedia terminal, the user at the calling multimedia terminal must dial the appropriate digits associated with the called terminal. However, the individual at the calling multimedia terminal may not necessarily know what number to dial. Currently, the number dialed by the user at the calling multimedia terminal depends both on the calling terminal's premises communication (i.e., PBX, direct line, etc.) and the calling terminal's access service. For example, if the calling and called multimedia terminals are both behind a common PBX network, then the user at the calling terminal need only to dial as few as four digits to reach the called terminal. To reach a called multimedia terminal outside the PBX network, the user at the calling multimedia terminal may have to dial 10 or more digits.

In some instances, multiple digital channels may be needed to establish a communications path of sufficient bandwidth between the calling and called multimedia terminals. Typically, each digital channel has its own associated number. Thus, when two or more separate channels are required, the user at the calling multimedia terminal must place two or more separate calls through the network to establish a connection with the called multimedia terminal.

Even if the user at the calling multimedia terminal has successfully dialed the appropriate number(s) to set up a call to one or more called multimedia terminals, it may not be possible to engage in a conference call among the terminals because of equipment incompatibility. Presently, there are several different types of multimedia terminals and not all are compatible with each other due to different communication protocols, media encoding algorithms and/or formatting schemes. Thus, a user at a calling multimedia terminal who attempts to establish a multimedia call must not only know the particular dial sequence necessary to set up the call but whether each called multimedia terminal is compatible.

Thus, there is a need for a technique to facilitate communications between a calling and called multimedia terminals.

BRIEF SUMMARY OF THE INVENTION

Briefly, a technique is disclosed for enabling a calling multimedia terminal to readily communicate across one or more communications networks with one or more called multimedia terminals. In accordance with the invention, a unique identifier is assigned to each multimedia terminal that is typically communicated to the network when the terminal is attached. The identifier establishes the identity of the terminal, and attributes that are specific to that terminal, including, for example, its communications protocol(s). media encoding algorithm(s) and/or formatting scheme(s). The identifiers are stored in one or more data bases within the network. When a multimedia communications path is to be established between calling and called multimedia terminals, the calling terminal supplies its identifier and the identifier of each called terminal. Upon receipt of the identifiers, the data base is accessed to determine the optimal terminal communications attributes of the communications path(s) needed to connect the calling multimedia terminal to each called multimedia terminal. The appropriate communications path is then automatically established by intelligence within the network in accordance with the identifiers of the calling and called terminals, and information that may be stored in the data base associated with the end-point identifiers, to connect the terminals to each other.

DETAILED DESCRIPTION

Figure 1:
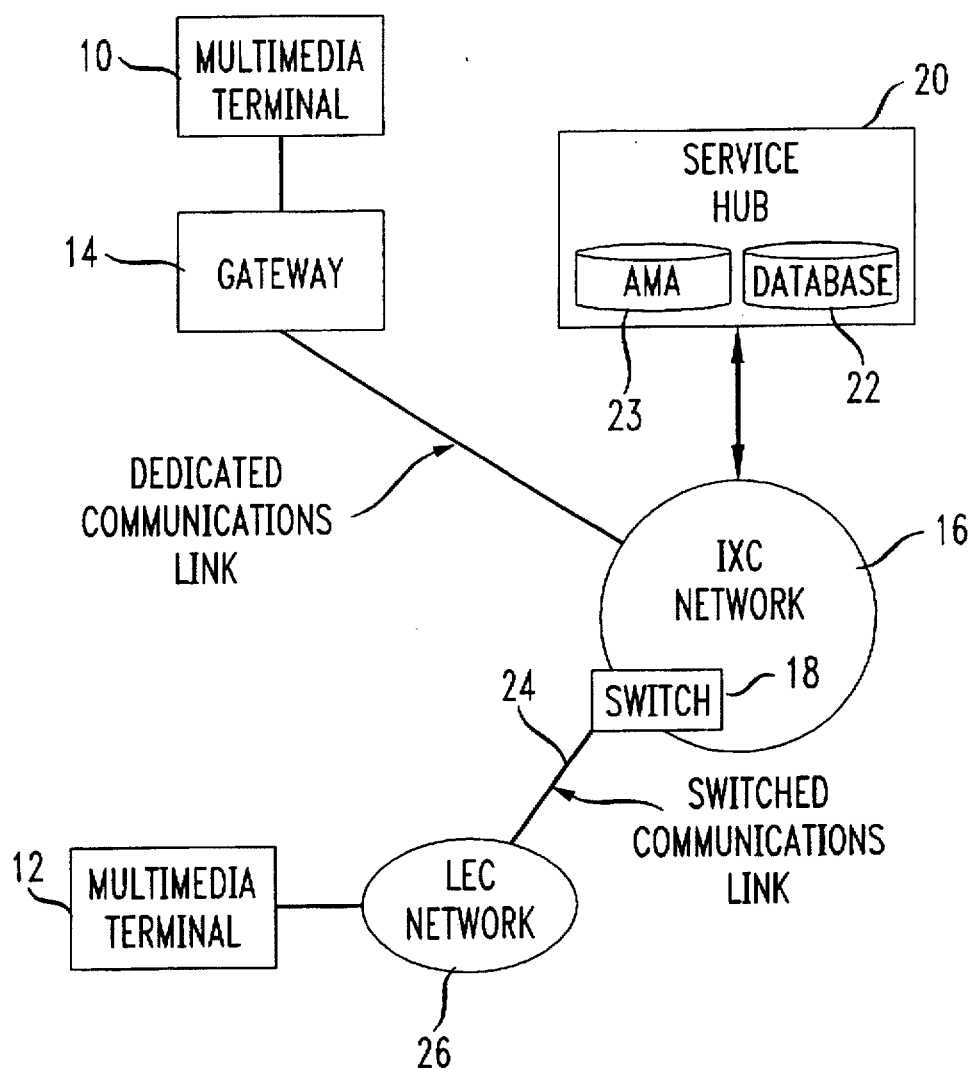
FIG. 1 is a block schematic diagram of a communications network for practicing the communications technique of the invention.

FIG. 1 depicts a communications system that includes at least two multimedia terminals 10 and 12. Each of the multimedia terminals 10 and 12 may take the form of a personal computer that incorporates a video/audio/data conferencing system, such as the AT&T Vistium™ system or the Intel ProShare™ Personal Conferencing Video system. When so configured, each multimedia terminal can communicate with a similarly configured terminal to share video, audio, and data during a multimedia call. Rather than configure each multimedia terminal as a personal computer, one or more of the terminals could comprise a Video telephone, such as AT&T's Videophone 2500. Alternatively, one or more of the multimedia terminals 10 and 12 could comprise a personal computer configured with audio-only conference capability, rather than with both audio and video conference capabilities.

In the illustrated embodiment, the multimedia terminal 10 is coupled to a gateway 14, such as a Private Branch Exchange (PBX), a Local Area Network (LAN), a server, or a router, that couples the terminal to network 16 via a dedicated communications path 18, such as a T1 trunk. As seen in FIG. 1, the network 16 is maintained by an Inter-Exchange Carrier (IXC), such as AT&T. Within the network 16 is at least one switch 18, such as AT&T's 4ESS switch, for routing calls through the network, including calls between the multimedia terminals 10 and 12. Associated with the network 16 is at least one service hub 20 that contains one or more processors (not shown) that serve as the intelligence for the network to control its operation. The hub 20 also includes at least one data base 22 for storing information about the network.

Typically, the IXC network 16 is coupled by at least one switched communications path 24 to a telecommunications network 26 maintained by a Local Exchange Carrier (LEC). In the illustrated embodiment, it is the LEC network 26 that couples the multimedia terminal 12 to the IXC network 16. However, it should be understood that the terminal 12 could be coupled to the IXC network 16 via a gateway (not shown) similar to the gateway 14. Under such circumstances, the LEC network 26 is bypassed. Although not shown, the multimedia terminal 12 (as well as the terminal 10) could easily be connected to the IXC network 16 via a cellular telephone network, such as that provided by AT&T Wireless Services.

In the past, establishing a communications path to allow a multimedia call between the multimedia terminals 10 and 12 has been relatively difficult. A user at the multimedia terminal 10 wishing to call the multimedia terminal 12 had to know the location and communications attributes of the called terminal in order dial the proper number(s) to set up the proper call path. Moreover, even if the user of the multimedia terminal 10 was successful in completing a call to the multimedia terminal 12, there was no guarantee that the terminals would actually communicate with each other because of possible platform incompatibilities.

In accordance with the invention, a technique is provided to readily facilitate a communication path between a calling multimedia terminal (e.g., terminal 10) and at least one called multimedia terminal (e.g., terminal 12). To facilitate such a communication path in accordance with the invention, each of the multimedia terminals 10 and 12 is assigned a unique end-point identifier. The end point identifier typically comprises a string of characters (numbers and/or letters) that uniquely identifies the terminal in terms of its particular attributes, such as its communications protocol(s), media encoding algorithm(s) and/or formatting scheme(s). For example, if the multimedia terminal 10 required a 2×64 Kbps communications path, the end-point identifier associated with this terminal would specify this requirement. Additionally, if the multimedia terminal 10 required a certain communications protocol, operating format or routing, its end-point identifier would also specify such a requirement.

The end-point identifier assigned to each of the multimedia terminals 10 and 12 is stored in the data base 22 in the service hub 20 associated with the network 16. (In the event that there are multiple service hubs and multiple data bases, the end-point identifiers may be distributed among such data bases.) In practice, the end-point identifier associated with each multimedia terminal is entered into the data base 22 upon initial installation of the terminal. In this way, the data base 22 contains a record of all of the multimedia terminals 10 and 12 to which calls may be placed.

Associated with each end-point identifier is information that identifies the location of the terminal and routing data needed to route an appropriate communications path to the terminal. Such associated information may be entered manually upon attachment of the multimedia terminal to the network, or could be entered manually or automatically at the outset of each multimedia call. Alternatively, the network hub 20 could automatically develop the information upon attachment of the multimedia terminals 10 and 12.

The associated information may include details about the capability of each multimedia terminal. Further, the associated information might include billing information such as an account number associated with the multimedia terminal so that the service provider can bill the calling party, or bill another party for calls made from that terminal. To facilitate billing, the service hub 20 typically includes an Automated Message Accounting (AMA) system 23. The AMA 23 generates a billing record to record billing information associated with multimedia calls placed between the calling and called multimedia terminals 10 and 12.

Normally, the end-point identifier associated each multimedia terminal is fixed because the attributes (e.g., communications protocols, multimedia encoding schemes and formats) associated with that terminal generally do not change. Accordingly, it may be desirable to firmly fix the end-point identifier in the corresponding multimedia terminal by burning or otherwise permanently fixing the identifier in a chip (not shown) in much the same way that identifying information is currently burned into a cellular telephone. For this reason, it may not be desirable to directly attribute to each end-point identifier information such as the location of the terminal and the billing account of the user of that terminal because such details may likely change, necessitating replacement of the chip containing the end-point identifier. However, it may be desirable to directly attribute such location and billing information to the end-point identifier so that the string of characters comprising the end-point identifier reflects such details, rather than store such details separately.

Under some circumstances, it may be necessary to update the end-point identifier corresponding to each of the multimedia terminals 10 and 12 to reflect changes in the terminal hardware and/or software. For example, following certain hardware and/or software changes to the multimedia terminal 10, one or more of the attributes associated with that terminal may now be different. Alternatively, when the end-point identifier itself is to contain location and routing information, it may be necessary to update the end-point identifier to reflect a change in the location of the multimedia terminal. Thus, it may be desirable to automatically update the end-point identifier for each calling terminal (e.g., terminal 10) each time the terminal makes a multimedia call.

It may also be desirable to update the stored information associated with the end-point identifier (or the identifier itself when it contains location information) to permit a type of "follow me" service for users. For the most part, each multimedia terminal typically has a dedicated user or is dedicated to a particular facility or entity. Thus, the association of that terminal with a particular user or entity usually does not change. However, in some instances, it may be desirable to provide "public" multimedia terminals, similar to public telephones, that will have different users on a regular basis. For example, a public multimedia terminal may be located at a hotel or airport for access by travelers. To permit a traveler to receive a multimedia call that would otherwise be directed to his or her own terminal, the traveler would update the associated information stored with the end-point identifier of such a "public" multimedia terminal to reflect that the traveler is now using that terminal. The traveler's identity, as well as any specialized billing information, are passed to the data base 22 within the service hub 20 for storage as information now associated the end-point identifier for this public multimedia terminal. For each new user of the public multimedia terminal, it is necessary to update the associated information stored along with the terminal's identifier to allow a multimedia call to reach the user at such a public multimedia terminal.

To establish a connection with at least one called multimedia terminal (e.g., terminal 12), a user at the calling multimedia terminal (e.g., terminal 10) first goes "off hook" in much the same way that a telephone subscriber lifts the receiver of a conventional telephone set in preparation to place a telephone call. Once off hook, the user at the calling multimedia terminal 10 receives an acknowledgment, in the form of a multimedia dial tone that typically comprises both an audio tone as well as a video display symbolic of the terminal now being off hook. Next, the user at the calling terminal enters the end-point identifier of each called terminal 12, together with any associated information needed to complete the call. Depending on the network, the user may have to supply her or her identity, in the form of a billing account number, and any attributes of the terminal that the user may want to modify. For example, even though the end-point identifier of the calling multimedia terminal may automatically identify the terminal as having video capability, a user may want to temporarily disable that capability.

Depending on the capabilities of the calling terminal 10 and the gateway 14, the user may not have to actually enter the calling multimedia terminal's end-point identifier because the end-point identifier could be generated by the terminal and/or the gate way 14 automatically in much the same way that a conventional personal computer may automatically generate password log-on sequences to an on-line service. Moreover, the calling multimedia terminal could be programmed to automatically generate any necessary associated information that must be sent along with the end-point identifier to initiate the multimedia call. If the necessary associated information is already present in the data base 22, the user at the calling multimedia terminal may only need to enter the end-point identifier of each called terminal to initiate a multimedia call.

After the calling terminal 10 goes off hook, and the end-point identifiers, along with any associated information, are entered, the gateway 14 establishes a communications path through the IXC network 16 with the service hub 20. The gateway 14 provides the necessary protocol translations needed to interface the calling multimedia terminal 10 to the IXC network 16. (In the case when the multimedia call originates at the multimedia terminal 12, then the LEC network 26 would provide the necessary protocol to interface the terminal to the IXC network 16 so the call could reach the hub 20.) Upon receipt of the call from the calling multimedia terminal 10, the service hub 20 utilizes its intelligence to establish a multimedia session and instructs the network 16 accordingly. In that regard, the hub 20 accesses the data base 22 to determine the location and communications attributes of each called multimedia terminal based on the point identifiers, and associated information that is stored in the data base and/or received from the calling multimedia terminal 10.

From the information stored in the data base 22, the hub 20 instructs the network 16 to establish a multimedia call path to each called terminal, taking into account the location of each called terminal and its associated communications attributes. Once the call path has been set up through the network 16 to each called multimedia terminal, the call path between each calling terminal 10 and network 16 is merged with the call path between the network and the calling terminal 10 so the service hub 20 can be removed from the call.

The above-described technique for establishing a multimedia call between a calling and called terminal affords a distinct advantage. The user (caller) at the calling terminal need not be concerned with the location and communications attributes of each called terminal. All the user needs to know is the end-point identifier of each called terminal. Typically, the end-point identifier for each called terminal is known in advance. For example, the individual user associated a multimedia terminal will likely publicize the end-point identifier of his or her terminal, via business cards, directory listings, advertisements or the like. To the extent that a user at a calling multimedia terminal did not know the end-point identifier of a called terminal, the service hub 20 could provide a directory assistance service in much the same way that service providers such as AT&T offer directory assistance for conventional voice calls.

All of the decision making associated with setting up a multimedia call between the calling and called terminal is accomplished by the intelligence within the service hub 20 in accordance with the end-point identifiers and associated information stored in the data base 22. In this way, user at the calling terminal 10 can rely on the intelligence within the hub 20 to accomplish call set up automatically without any concern as to the communications attributes of the calling and called terminals. Thus, by assigning end-point identifiers to each of the multimedia terminals 10 and 12 and by using such identifiers to automatically set up multimedia calls, the overall ease of establishing such calls is greatly improved.

The foregoing describes a technique for establishing a communication path between a calling and called multimedia terminals 10 and 12.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A technique for enabling a calling multimedia terminal to readily communicate across at least one network with at least one called multimedia terminal, comprising the steps of:

assigning a unique identifier to each multimedia terminal indicative of at least some of its communications attributes;

storing the identifier corresponding to each terminal within at least one data base associated with at least one the network;

receiving from the calling terminal its own identifier and the identifier associated with each called terminal;

accessing the data base(s) to establish the communication attributes for the calling multimedia terminal and each called multimedia terminal; and automatically establishing, in accordance with communications attributes of the calling and called terminals, a communications path between the calling and each called multimedia terminal through at least one network to enable the called terminal to readily communicate with each called terminal.

2. The method according to claim 1 wherein each identifier specifies a protocol, multimedia encoding algorithm and formatting requirement for the multimedia terminal.

3. The method according to claim 2 wherein each identifier specifies where the terminal is located.

4. The method according to claim 1 wherein the data base stores information associated with each identifier that identifies where the multimedia terminal is located.

5. The method according to claim 1 wherein the data base stores information associated with each identifier that identifies a billing account associated with a user of the terminal identified by said each identifier.

6. The method according to claim 1 wherein the calling terminal automatically generates at least a portion of its identifier.

7. The method according to claim 4 further including the step of accessing the data base to determine the identifier of the multimedia terminal to be called.

8. The method according to claim 1 wherein the identifier for each terminal is stored in the data base(s) upon initial attachment of the terminal to said one network.

9. The method according to claim 1 further including the step of updating the point identifier in the data base each time the identifier of a calling terminal is received.

10. The method according to claim 8 further including the steps of:

establishing a location for each terminal following attachment of that terminal; and storing with each identifier information that identifies the location of the terminal.

11. The method according to claim 1 further including the step of generating a billing record upon the establishment of a calling path between the calling and called multimedia terminals.

12. The method according to claim 1 wherein the data base stores information associated with the identifier indicating that a user of the multimedia identified by the identifier has presubscribed to a particular service.

13. A technique for enabling a calling multimedia terminal to readily communicate across at least one network with at least one called multimedia terminal, comprising the steps of:

assigning a unique identifier to each multimedia terminal indicative of its required communications attributes;

storing the identifier corresponding to each terminal within at least one data base associated with at least one the network;

storing within said one data base information associated with each identifier that is necessary to establish a communications path with the terminal identified by the identifier;

receiving from the calling terminal its own identifier and the identifier associated with each called terminal;

accessing the data base(s) to establish parameters for a calling path between communication attributes for the calling multimedia terminal and each called multimedia terminal in accordance with the terminal identifiers and associated information; and automatically establishing, in accordance with the calling path parameters, a calling path between the calling and each called multimedia terminal through at least one network to enable the called terminal to readily communicate with each called terminal.

14. The method according to claim 13 wherein each identifier specifies a protocol, multimedia encoding algorithm and formatting requirement for the multimedia terminal.

15. The method according to claim 13 wherein the data base stores information associated with each identifier that identifies a billing account associated with a user of the terminal identified by said each identifier.

16. The method according to claim 13 wherein the calling terminal automatically generates at least a portion of its identifier.

17. The method according to claim 13 further including the step of accessing the data base to determine the identifier of the multimedia terminal to be called.

18. The method according to claim 13 wherein the identifier for each terminal is stored in the data base(s) upon initial attachment of the terminal to said one network.

19. The method according to claim 13 further including the step of updating the point identifier in the data base each time the-point identifier of a calling terminal is received.

20. The method according to claim 13 further including the step of generating a billing record upon the establishment of a calling path between the calling and called multimedia terminals.

21. The method according to claim 13 wherein the data base stores information associated the identifier establishing that a user of the multimedia identified by the identifier has presubscribed to a particular service.

* * * * *